(12) United States Patent
Matsui et al.

(10) Patent No.: US 10,071,541 B2
(45) Date of Patent: Sep. 11, 2018

(54) LAMINATE BODY FOR ROLL MOLDING, AND MOLDED BODY OF SAME

(71) Applicant: SUMITOMO CHEMICAL COMPANY, LIMITED, Tokyo (JP)

(72) Inventors: Kazuya Matsui, Chiba (JP); Hiroaki Shimojima, Chiba (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 63 days.

(21) Appl. No.: 15/129,776

(22) PCT Filed: Mar. 27, 2015

(86) PCT No.: PCT/JP2015/060530
§ 371 (c)(1),
(2) Date: Sep. 27, 2016

(87) PCT Pub. No.: WO2015/152389
PCT Pub. Date: Oct. 8, 2015

(65) Prior Publication Data
US 2017/0144417 A1    May 25, 2017

(30) Foreign Application Priority Data

Mar. 31, 2014    (JP) ................................ 2014-071722

(51) Int. Cl.
| | | |
|---|---|---|
| *B32B 27/08* | (2006.01) | |
| *B29C 43/22* | (2006.01) | |
| *B29C 43/30* | (2006.01) | |
| *B29C 43/24* | (2006.01) | |
| *B32B 27/32* | (2006.01) | |
| *B32B 27/20* | (2006.01) | |
| *B29K 21/00* | (2006.01) | |
| *B29K 23/00* | (2006.01) | |
| *B29K 509/00* | (2006.01) | |
| *B29L 31/30* | (2006.01) | |

(52) U.S. Cl.
CPC ............ *B32B 27/08* (2013.01); *B29C 43/222* (2013.01); *B29C 43/24* (2013.01); *B29C 43/305* (2013.01); *B32B 27/20* (2013.01); *B32B 27/32* (2013.01); *B29K 2021/003* (2013.01); *B29K 2023/12* (2013.01); *B29K 2509/00* (2013.01); *B29K 2995/0089* (2013.01); *B29L 2031/3005* (2013.01); *B32B 2250/02* (2013.01); *B32B 2264/10* (2013.01); *B32B 2264/102* (2013.01); *B32B 2270/00* (2013.01); *B32B 2274/00* (2013.01); *B32B 2307/558* (2013.01); *B32B 2307/56* (2013.01); *B32B 2307/732* (2013.01); *B32B 2509/00* (2013.01); *B32B 2605/00* (2013.01); *B32B 2605/003* (2013.01); *Y10T 428/2495* (2015.01)

(58) Field of Classification Search
None
See application file for complete search history.

(56) References Cited

U.S. PATENT DOCUMENTS

| | | | | |
|---|---|---|---|---|
| 4,842,951 A | * | 6/1989 | Yamada .................. | B32B 27/08 428/516 |
| 5,714,227 A | * | 2/1998 | Sugawara ............... | B29C 49/04 264/134 |
| 6,268,064 B1 | * | 7/2001 | Kim ........................ | B32B 27/32 428/516 |
| 2005/0101738 A1 | * | 5/2005 | Shimojo ............. | C08F 297/083 525/240 |
| 2011/0305896 A1 | * | 12/2011 | Campbell ............... | B29C 51/46 428/324 |
| 2015/0239204 A1 | | 8/2015 | Takebe et al. | |

FOREIGN PATENT DOCUMENTS

| | | | |
|---|---|---|---|
| JP | 59-165654 | A | 9/1984 |
| JP | S60-141535 | A | 7/1985 |
| JP | 61-144343 | A | 7/1986 |
| JP | 62-290537 | A | 12/1987 |
| JP | 63-11335 | A | 1/1988 |
| JP | 4-4147 | A | 1/1992 |
| JP | 5-138843 | A | 6/1993 |
| JP | H05-138843 | A | 6/1993 |
| JP | 7-125160 | A | 5/1995 |
| JP | 8-267682 | A | 10/1996 |

(Continued)

OTHER PUBLICATIONS

International Search Report for PCT/JP2015/060530 dated Jul. 7, 2015; English translation submitted herewith (5 Pages).
English translation of the International Preliminary Report on Patentablity for PCT/JP2015/060530 (5 pages).
European Search Report issued against the corresponding European Patent Application EP 15 77 3512 dated Oct. 4, 2017.

*Primary Examiner* — David Sample
*Assistant Examiner* — Donald M Flores, Jr.
(74) *Attorney, Agent, or Firm* — Fitch, Even, Tabin & Flannery, LLP

(57) ABSTRACT

There is provided a stack for compression molding from which a molded article excellent in impact resistance can be obtained. The stack has a layer A containing a propylene polymer component (A1) and a thermoplastic elastomer component (A2), wherein the content of (A1) is 20% by weight to 80% by weight, and a layer B containing a propylene polymer component (B1) and an inorganic filler (B2), wherein the content of (B1) is 50% by weight to 80% by weight and the content of (B2) is 20% by weight to 50% by weight, wherein where the sum total of the thickness of the layer A and the thickness of the layer B is taken as 100%, the ratio of the thickness of the layer A is 0.5% to 10% and the ratio of the thickness of the layer B is 90% to 99.5%, and wherein the layer A is disposed to form at least one surface.

9 Claims, No Drawings

(56) References Cited

FOREIGN PATENT DOCUMENTS

| | | |
|---|---|---|
| JP | 2008-169316 A | 7/2008 |
| JP | 2014-091218 A | 5/2014 |
| JP | 2015096586 A | 5/2015 |
| WO | 2014-042253 A1 | 3/2014 |

\* cited by examiner

LAMINATE BODY FOR ROLL MOLDING, AND MOLDED BODY OF SAME

CROSS-REFERENCE TO RELATED APPLICATIONS

This application is a U.S. national phase application filed under 35 U.S.C. § 371 of International Application No. PCT/JP2015/060530, filed Mar. 27, 2015, designating the United States, and claims priority from Japanese Patent Application No. 2014-071722, filed Mar. 31, 2014, and the complete disclosures of which applications are hereby incorporated herein by reference in their entirety for all purposes.

TECHNICAL FIELD

The present invention relates to a stack for compression molding from which can be obtained a molded article excellent in impact resistance, and to a molded article thereof.

BACKGROUND ART

Molded articles containing propylene polymers are used as various types of industrial parts such as automotive interior or exterior parts and household appliance parts due to their very low prices and light weights.

Compression molding is known as one of the methods for producing molded articles containing propylene polymers. Compression molding method is a method capable of improving the impact resistance of molded articles. In recent years, molded articles prepared by compression molding stacks containing propylene polymers have been developed.

For example, a laminate sheet composed of a thermoplastic resin layer containing a flaky filler and a thermoplastic resin layer containing substantially no flaky filler is disclosed in patent document 1 in order to improve impact resistance.

PRIOR ART DOCUMENTS

Patent Documents

Patent Document 1: JP-A-63-11335

SUMMARY OF THE INVENTION

Problem to be Solved by the Invention

However, the impact resistance of the sheet disclosed in patent document 1 is not necessarily fully satisfactory. Under such circumstances, the object of the present invention is to provide a stack for compression molding from which a molded article excellent in impact resistance can be obtained, and a molded article thereof.

Means for Solving the Problem

The present invention relates to a stack for compression molding comprising a layer A and a layer B each defined below, wherein where the sum total of the thickness of the layer A and the thickness of the layer B is taken as 100%, the ratio of the thickness of the layer A is 0.5% to 10% and the ratio of the thickness of the layer B is 90% to 99.5%, and wherein the layer A is disposed to form at least one surface of the stack, layer A: a layer comprising a propylene polymer component (A1) and a thermoplastic elastomer component (A2), wherein the content of (A1) is 20% by weight to 80% by weight and the content of (A2) is 20% by weight to 80% by weight, provided that the sum total of the content of (A1) and the content of (A2) is taken as 100% by weight, layer B: a layer comprising a propylene polymer component (B1) and an inorganic filler (B2), wherein the content of (B1) is 50% by weight to 80% by weight and the content of (B2) is 20% by weight to 50% by weight, provided that the sum total of the content of (B1) and the content of (B2) is taken as 100% by weight.

Effects of the Invention

According to the present invention, there can be obtained a stack for compression molding from which can be obtained a molded article excellent in impact resistance, and a molded article thereof.

MODES FOR CARRYING OUT THE INVENTION

[Layer A]

The layer A of the present invention comprises a propylene polymer component (A1) and a thermoplastic elastomer component (A2). Hereinafter, the propylene polymer component (A1) may be described as component (A1) and the thermoplastic elastomer component (A2) may; be described as component (A2).

The propylene polymer component (A1) refers to a propylene homopolymer or a propylene random copolymer. These may be used individually or two or more of them may be used in combination.

The propylene homopolymer refers to a polymer composed of constitutional units derived from propylene. The propylene homopolymer may be, for example, a propylene homopolymer having an isotactic structure or a propylene homopolymer having a syndiotactic structure. The propylene homopolymer is preferably a propylene homopolymer having an isotactic structure.

In the case of a propylene homopolymer having an isotactic structure, the isotactic pentad fraction thereof (hereinafter denoted by [mmmm]) measured by the $^{13}$C-NMR method is preferably 0.90 or more, more preferably 0.95 or more.

The isotactic pentad fraction as referred to herein indicates is a fraction of isotactic pentad sequences measured using $^{13}$C-NMR, and it refers to the fraction of constitutional units derived from propylene found in the center of sequences in which five constitutional units derived from propylene are continuously meso-linked. Specifically, the isotactic pentad fraction is calculated as a fraction of the mmmm peak relative to all the absorption peaks observed in a methyl carbon region of a $^{13}$C-NMR spectrum. The [mmmm] peak as referred to herein is a peak derived from propylene that is located at the center of five sequences which are continuously meso-linked.

The [mmmm] can be determined by, for example, the method described in a report produced by A. Zambelli et al. (Macromolecules, 1973, No. 6).

On the other hand, in the case of a propylene homopolymer having a syndiotactic structure, the syndiotactic pentad fraction thereof (hereinafter denoted by [rrrr]) measured by the $^{13}$C-NMR method is preferably 0.85 or more, more preferably 0.90 or more.

The syndiotactic pentad fraction as referred to herein indicates is a fraction of syndiotactic pentad sequences measured using $^{13}$C-NMR, and it refers to the fraction of constitutional units derived from propylene found in the center of sequences in which five constitutional units derived from propylene are continuously racemo-linked. Specifically, the syndiotactic pentad fraction is calculated as a fraction of the [rrrr] peak relative to all the absorption peaks observed in a methyl carbon region of a $^{13}$C-NMR spectrum. The [rrrr] peak as referred to herein is a peak derived from propylene that is located at the center of five sequences which are continuously racemo-linked.

The [mmmm] can be determined by the method described in JP-A-2008-169316.

The propylene random copolymer is a random copolymer composed of constitutional units derived from propylene and constitutional units derived from ethylene or an α-olefin having 4 to 10 carbon atoms or a random copolymer composed of constitutional units derived from propylene, constitutional units derived from ethylene, and constitutional units derived from an α-olefin having 4 to 10 carbon atoms.

Examples of the α-olefin having 4 to 10 carbon atoms include 1-butene, isobutene, 1-pentene, 2-methyl-1-butene, 3-methyl-1-butene, 1-hexene, 2-methyl -1-pentene, 3-methyl-1-pentene, 4-methyl-1-pentene, 1-octene, 1-nonene, and 1-decene, and preferred is 1-butene or 1-hexene.

Examples of the random copolymer composed of constitutional units derived from propylene and constitutional units derived from ethylene or an α-olefin having 4 to 10 carbon atoms include propylene-ethylene random copolymers, propylene-(1-butene) random copolymers, propylene-isobutene random copolymers, propylene-(1-pentene) random copolymers, propylene-(2-methyl -1-butene) random copolymers, propylene-(3-methyl-1-butene) random copolymers, propylene-(1-hexene) random copolymers, propylene-(2-methyl-1-pentene) random copolymers, propylene-(3-methyl-1-pentene) random copolymers, propylene-(4-methyl-1-pentene) random copolymers, propylene-(1-octene) random copolymers, propylene-(1-nonene) random copolymers, and propylene-(1-decene) random copolymers. Preferred as the random copolymer composed of constitutional units derived from propylene and constitutional units derived from ethylene or an α-olefin having 4 to 10 carbon atoms is a propylene-(1-butene) random copolymer or a propylene-(1-hexene) random copolymer.

Examples of the random copolymer composed of constitutional units derived from propylene, constitutional units derived from ethylene, and constitutional units derived from an α-olefin having 4 to 10 carbon atoms include propylene-ethylene-1-butene) random copolymers, propylene-ethylene-isobutene random copolymers, propylene-ethylene-(1-pentene) random copolymers, propylene-ethylene-(2-methyl-1-butene) random copolymers, propylene-ethylene-(3-methyl-1-butene) random copolymers, propylene-ethylene-(1-hexene) random copolymers, propylene-ethylene-(2-methyl-1-pentene) random copolymers, propylene-ethylene-(3-methyl-1-pentene) random copolymers, propylene-ethylene-(4-methyl-1-pentene) random copolymers, propylene-ethylene-(1-octene) random copolymers, propylene-ethylene-(1-nonene) random copolymers, and propylene-ethylene-(1-decene) random copolymers. Preferred as the random copolymer composed of constitutional units derived from propylene, constitutional units derived from ethylene, and constitutional units derived from an α-olefin having 4 to 10 carbon atoms is a propylene-ethylene-(1-butene) random copolymer.

The content of the constitutional units derived from propylene of the random copolymer composed of constitutional units derived from propylene and constitutional units derived from ethylene or an α-olefin having 4 to 10 carbon atoms is preferably 60% by weight to 99.9% by weight, more preferably 70% by weight to 99.9% by weight. The content of the constitutional units derived from ethylene or an α-olefin having 4 to 10 carbon atoms of the random copolymer composed of constitutional units derived from propylene and constitutional units derived from ethylene or an α-olefin having 4 to 10 carbon atoms is preferably 0.1% by weight to 40% by weight, more preferably 0.1% by weight to 30% by weight. It is noted that the whole quantity of the random copolymer composed of constitutional units derived from propylene and constitutional units derived from ethylene or an α-olefin having 4 to 10 carbon atoms is taken as 100% by weight. The content of the constitutional units derived from propylene and the content of the constitutional units derived from ethylene or an α-olefin having 4 to 10 carbon atoms are determined by the $^{13}$C-NMR method.

The content of the constitutional units derived from propylene of the random copolymer composed of constitutional units derived from propylene, constitutional units derived from ethylene, and constitutional units derived from an α-olefin having 4 to 10 carbon atoms is preferably 60% by weight to 99.9% by weight, more preferably 70% by weight to 99.9% by weight. The content of the constitutional units derived from ethylene of the random copolymer composed of constitutional units derived from propylene, constitutional units derived from ethylene, and constitutional units derived from an α-olefin having 4 to 10 carbon atoms is preferably 0.05% by weight to 20% by weight, more preferably 0.05% by weight to 15% by weight. The content of the constitutional units derived from an α-olefin having 4 to 10 carbon atoms of the random copolymer composed of constitutional units derived from propylene, constitutional units derived from ethylene, and constitutional units derived from an α-olefin having 4 to 10 carbon atoms is preferably 0.05% by weight to 20% by weight, more preferably 0.05% by weight to 15% by weight. It is noted that the random copolymer composed of constitutional units derived from propylene, constitutional unit derived from ethylene, and constitutional units derived from an α-olefin having 4 to 10 carbon atoms is taken as 100% by weight. The content of the constitutional units derived from propylene, the content of the constitutional units derived from ethylene, and the content of the constitutional units derived from an α-olefin having 4 to 10 carbon atoms are determined by the $^{13}$C-NMR method.

The melting point of the propylene polymer component (A1) determined by differential scanning calorimetry (hereinafter DSC) is preferably 150° C. or more, more preferably 155° C. or more, and even more preferably 160° C. or more. The amount of the heat of fusion of the propylene polymer component (A1) determined by DSC is preferably 60 J/g or more, more preferably 80 J/g or more, and even more preferably 90 J/g or more.

The melting point is the melting temperature of crystal phases contained in the propylene polymer component (A1). Specifically, it is a peak top temperature in the endothermic peak of the higher temperature-side in a DSC curve obtained when the temperature of the propylene polymer component (A1) is raised.

The amount of heat of fusion is the amount of heat required by crystal phases contained in the propylene polymer component (A1) in order to transfer to a molten state, and it is specifically calculated as the sum total of the peak areas of all the endothermic peaks in the DSC curve obtained when the temperature of the propylene polymer component is raised.

The melting point and the amount of heat of fusion are measured using DSC under the following conditions. (i) About 10 mg of a crystalline propylene polymer component (A1) is heat treated at 220° C. for 5 minutes under a nitrogen atmosphere, and then is cooled to 50° C. at a temperature ramp-down rate of 10° C./minute. (ii) Subsequently, it is held at 50° C. for 1 minute and then heated from 50° C. to 180° C. at a temperature ramp-up rate of 10° C./minute.

The melt flow rate of the propylene polymer component (A1) is preferably 0.05 g/10 minutes to 20 g/10 minutes, more preferably 0.1 g/10 minutes to 10 g/10 minutes. The melt flow rate is a value measured by the method provided for in JIS K6758 at 230° C. under a load of 2.16 kg. The smaller the value of the melt flow rate of the propylene polymer component (A1), the better in impact resistance a molded article thereof is.

In the present invention, the propylene polymer (B) can be produced by a conventional polymerization method using a catalyst system formed by bringing a known solid titanium-containing catalyst system component, an organometallic compound catalyst component, and optionally an electron donor into contact with each other, a catalyst system formed by bringing a compound of a transition metal of Group 4 of the periodic table having a cyclopentadienyl ring and an alkyl aluminoxane into contact with each other, or a catalyst system formed by bringing a compound of a transition metal of Group 4 of the periodic table having a cyclopentadienyl ring, a compound capable of reacting with the transition metal compound to form an ionic complex, and an organoaluminum compound into contact with each other.

The thermoplastic elastomer component (A2) is an olefin-based elastomer or a styrene-based elastomer, and these may be used individually or two or more of them may be used in combination.

In the present invention, the olefin-based elastomer is a copolymer comprising constitutional units derived from propylene or an α-olefin having 4 to 10 carbon atoms and constitutional units derived from ethylene. Examples of the α-olefin having 4 to 10 carbon atoms include 1-butene, isobutene, 1-pentene, 2-methyl-1-butene, 3-methyl-1-butene, 1-hexene, 2-methyl-1-pentene, 3-methyl-1-pentene, 4-methyl-1-pentene, 1-octene, 1-nonene, and 1-decene. Preferred as propylene or the α-olefin having 4 to 10 carbon atoms is propylene, 1-butene, 1-hexene, or 1-octene, and more preferred is propylene or 1-butene. The olefin-based elastomer may have two or more types of constitutional units derived from propylene or an α-olefin having 4 to 10 carbon atoms.

The olefin-based elastomer may have constitutional units derived from propylene or an α-olefin having 4 to 10 carbon atoms, constitutional units derived from ethylene, and additionally constitutional units derived from another monomer. Examples of such another monomer include conjugated dienes having 4 to 8 carbon atoms such as 1,3-butadiene, 2-methyl-1,3-butadiene (isoprene), 1,3-pentadiene, and 2,3-dimethyl-1,3-butadiene; non-conjugated dienes having 5 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene; vinyl ester compounds such as vinyl acetate; unsaturated carboxylic acid esters, such as methyl acrylate, ethyl acrylate, butyl acrylate, methyl methacrylate, and ethyl methacrylate; and unsaturated carboxylic acids such as acrylic acid and methacrylic acid. Preferred as another monomer is 5-ethylidene-2-norbornene or dicyclopentadiene. The olefin-based elastomer may have two or more types of constitutional units derived from other monomers.

Examples of the olefin-based elastomer include ethylene-propylene copolymers, ethylene-(1-butene) copolymers, ethylene-(1-hexene) copolymers, ethylene-(1-octene) copolymers, ethylene-propylene-(1-butene) copolymers, ethylene-propylene-(1-hexene) copolymers, ethylene-propylene-(1-octene) copolymers, ethylene-propylene-(5-ethylidene-2-norbornene) copolymers, ethylene-propylene-dicyclopentadiene copolymers, ethylene-propylene-(4-hexadiene) copolymers, and ethylene-propylene-(5-vinyl-2-norbornene) copolymers. Olefin-based elastomers may be used individually or two or more of them may be used in combination. Preferred as the olefin-based elastomer is an ethylene-propylene copolymer, an ethylene-(1-butene) copolymer, an ethylene-(1-hexene) copolymer, an ethylene-(1-octene) copolymer, or an ethylene-propylene-(5-ethylidene-2-norbornene) copolymer, and more preferred is an ethylene-propylene copolymer or an ethylene-(1-butene) copolymer.

The content of the constitutional units derived from ethylene of the olefin-based elastomer is preferably 30% by weight to 95% by weight, more preferably 40% by weight to 80% by weight. The content of the constitutional units derived from propylene or an α-olefin having 4 to 10 carbon atoms of the olefin-based elastomer is preferably 5% by weight to 70% by weight, more preferably 20% by weight to 60% by weight. It is noted that the sum total of the content of the constitutional units derived from ethylene and the constitutional units derived from propylene or an α-olefin having 4 to 10 carbon atoms is taken as 100% by weight.

When the olefin-based elastomer comprises constitutional units derived from propylene or an α-olefin having 4 to 10 carbon atoms, constitutional units derived from ethylene, and additionally constitutional units derived from other monomers, the contents of the constitutional units derived from other monomers is preferably 1 part by weight to 40 parts by weight, more preferably 5 parts by weight to 25 parts by weight. It is noted that the sum total of the content of the constitutional units derived from ethylene and the constitutional units derived from propylene or an α-olefin having 4 to 10 carbon atoms is taken as 100 parts by weight.

The content of the constitutional units derived from propylene or an α-olefin having 4 to 10 carbon atoms, the content of the constitutional units derived from ethylene, and the content of the constitutional units derived from other monomers are determined by the $^{13}$C-NMR method.

The olefin-based elastomer can be produced by a publicly known polymerization method using a publicly known catalyst. Examples of such a publicly known catalyst include catalyst systems composed of a vanadium compound and an organoaluminum compound, Ziegler-Natta catalyst systems, and metallocene catalyst systems. Examples of such a publicly known polymerization method include a solution polymerization method, a slurry polymerization method, a high-pressure ion polymerization method, and a gas phase polymerization method.

Examples of said styrene-based elastomer include block copolymers composed of constitutional units derived from a vinyl aromatic compound and constitutional units derived from a conjugated diene, and hydrogenated block copolymers in which double bonds derived from conjugated dienes of the aforesaid block copolymers have been hydrogenated. Preferred as the styrene-based elastomer is a block copolymer in which 80% or more of the double bonds derived from a conjugated dine of a block copolymer composed of constitutional units derived from a vinyl aromatic compound and constitutional units derived from a conjugate diene has been hydrogenated, and more preferred is a block copolymer in which 85% or more of the double bonds derived from a conjugated diene has been hydrogenated.

Specific examples of the styrene-based elastomer include block copolymers such as styrene-ethylene-butene-styrene rubbers (SEBS), styrene-ethylene-propylene-styrene rubbers (SEPS), styrene-butadiene rubbers (SBR), styrene-butadiene-styrene rubbers (SBS), and styrene-isoprene-styrene rubbers (SIS), or hydrogenated products thereof.

The melting point of the thermoplastic elastomer component (A2) measured by DSC is preferably lower than 150° C. The amount of the heat of fusion of the thermoplastic elastomer component (A2) determined by DSC is preferably less than 120 J/g, more preferably less than 70 J/g, and even more preferably less than 60 J/g.

The melting point of the thermoplastic elastomer component (A2) is the melting temperature of crystal phases contained in the thermoplastic elastomer component (A2), and specifically, it is a peak top temperature in the endothermic peak of the higher temperature-side in a DSC curve obtained when the temperature of the thermoplastic elastomer component (A2) is raised.

The amount of heat of fusion of the thermoplastic elastomer component (A2) is the amount of heat required by crystal phases contained in the thermoplastic elastomer component (A2) in order to transfer to a molten state, and it is specifically calculated as the sum total of the peak areas of all the endothermic peaks in the DSC curve obtained when the temperature of the thermoplastic elastomer component (A2) is raised.

The melting point and the amount of heat of fusion are measured using DSC under the following conditions. (i) About 10 mg of a thermoplastic elastomer component (A2) is heat treated at 220° C. for 5 minutes under a nitrogen atmosphere, and then is cooled to 50° C. at a temperature ramp-down rate of 10° C./minute. (ii) Subsequently, it is held at 50° C. for 1 minute and then heated from 50° C. to 180° C. at a temperature ramp-up rate of 10° C./minute.

It is preferred to use an olefin-based elastomer as the thermoplastic elastomer component (A2) from the viewpoint of economical efficiency or impact resistance.

The melt flow rate of the thermoplastic elastomer component (A2) is preferably 1 g/10 minutes to 20 g/10 minutes, more preferably 2 g/10 minutes to 15 g/10 minutes. The melt flow rate is a measured by the method provided for in JIS K6758 at 190° C. under a load of 2.16 kg. The smaller the value of the melt flow rate of the thermoplastic elastomer component (A2), the better in impact resistance a molded article obtainable from the stack for compression molding.

The content of the propylene polymer component (A1) contained in the layer A of the present invention is 20% by mass to 80% by weight, and preferably the content of the (A1) is 25% by mass to 50% by weight. The content of the thermoplastic elastomer component (A2) contained in the layer A of the present invention is 20% by weight to 80% by weight, and preferably 30% by weight to 60% by weight. It is noted that the sum total of the content of the (A1) and the content of the (A2) is taken as 100% by weight.

[Layer B]

The layer B of the present invention comprises a propylene polymer component (B1) and an inorganic filler (B2).

Materials for use as the propylene polymer component (B1) may be those for use as the propylene polymer component (A1) contained in the layer A.

Examples of the inorganic filler include mica, glass flake, glass fiber, and talc. These may be used individually or two or more of them may be used in combination. Talc is preferred as the inorganic filler (B2).

(Median Diameter D50(L) to be Measured by the Laser Diffraction Method)

When a scaly filler such as mica and talc is used as the inorganic filler (B2), it is preferred from the viewpoint of the impact resistance of a molded article to be obtained from the stack for compression molding that the median diameter D50(L) of the inorganic filler (B2) to be measured by the laser diffraction method in accordance with JIS R1629 be 10 µm to 25 µm.

The median diameter D50(L) is determined from a particle diameter value at an accumulated amount of 50% by weight read from a particle size accumulation distribution curve measured by use of a laser method particle size distribution analyzer in accordance with JIS R1629. Examples of the laser method particle size distribution analyzer include MT-3300EX II manufactured by Nikkiso Co., Ltd.

(Median Diameter D50(S) to be Measured by the Centrifugal Sedimentation Method)

When a scaly filler such as mica and talc is used as the inorganic filler (B2), the median diameter D50(S) of the inorganic filler (B2) to be measured by the centrifugal sedimentation method in accordance with JIS R1619 is preferably 2 µm to 8 µm.

The median diameter D50(S) is determined from a particle diameter value at an accumulated amount of 50% by weight read from a particle size accumulation distribution curve measured by use of a centrifugal sedimentation method particle size distribution analyzer in accordance with JIS R1619. Examples of the centrifugal sedimentation method particle size distribution analyzer include SA-CP3 manufactured by Shimadzu Corporation.

(Aspect Ratio Constant)

When a scaly filler such as mica and talc is used as the inorganic filler (B2), the aspect ratio constant of the inorganic filler (B2) is preferably 2 to 15. The aspect ratio constant is calculated by the following formula (1) from values of the aforementioned median diameter D50(L) and the aforementioned median diameter D50(S).

$$\text{Aspect ratio constant} = \{D50(L) - D50(S)\}/D50(S) \quad \text{formula (1)}$$

When a fibrous filler such as glass fiber is used as the inorganic filler (B2), the number average fiber length of the inorganic filler (B2) is preferably 1 mm to 5 mm.

The content of the propylene polymer component (B1) contained in the layer B of the present invention is 50% by weight to 80% by weight, and preferably 60% by weight to 75% by weight. The content of the inorganic filler (B2) contained in the layer B of the present invention is 20% by weight to 50% by weight, and preferably 25% by weight to 40% by weight. It is noted that the sum total of the content of the (B1) and the content of the (B2) is taken as 100% by weight.

The layer A of the present invention may comprise the inorganic filler (B2). When the layer A comprises the inorganic filler (B2), the content of the inorganic filler (B2) is 5 parts by weight to 45 parts by weight, and preferably 10 parts by weight to 25 parts by weight, relative to 100 parts by weight of the layer A.

The layer B of the present invention may comprise a thermoplastic elastomer component (A2). When the layer B comprises the thermoplastic elastomer (A2), the content of the thermoplastic elastomer (A2) is 0.5 parts by weight to 12 parts by weight, and preferably 1 part by weight to 5 parts by weight, relative to 100 parts by weight of the layer B.

Examples of a method for mixing the individual components that constitute the layer A and the layer B of the present invention include a method in which the individual components are melt kneaded with a kneading machine, such as a single screw extruder, a twin screw extruder, a Banbury mixer, and a hot roll; and a method in which the individual components are mixed during a polymerization reaction for producing the propylene polymer component (A1), the propylene polymer component (B1), or the thermoplastic elastomer component (A2).

Examples of a method for producing the layer A and the layer B of the present invention include press forming, extrusion forming, and injection molding.

[Stack for Compression Molding]

The stack for compression molding of the present invention is a stack comprising at least one layer A and at least one layer B.

In the stack for compression molding of the present invention, the layer A is disposed such that it forms at least one surface of the stack. The stack for compression molding may be a two-layer stack composed of one layer A and one layer B, or may be a three-layer stack in which a layer A is disposed on both sides of a layer B, or may be a multilayer stack composed of at least one layer A and a plurality of layers B, wherein said layer A is disposed such that it forms at least one surface of the stack.

In the stack for compression molding of the present invention, the ratio of the thickness of the layer A is preferably 0.5% to 10% and the ratio of the layer B is preferably 90% to 99.5% where the sum total of the overall thickness of the layer(s) A and the overall thickness of the layer(s) B is taken as 100%. More preferably, the ratio of the thickness of the layer A is 0.8% to 5% and the ratio of the thickness of the layer B is 95% to 99.2%.

The stack for compression molding of the present invention may contain a modified polymer in order to improve the dispersibility of the inorganic filler (B2) in a molded article. Examples of the modified polymer include maleic acid-modified polypropylene.

The modified polymer is preferably contained in an amount of 3 parts by weight to 15 parts by weight per 100 parts by weight of the stack for compression molding in order to render impact resistance satisfactory.

The stack for compression molding of the present invention may contain various additives or crystal nucleating agents.

Examples of the additives include antioxidants, UV absorbers, antistatic agents, lubricants, pressure sensitive adhesives, anticlouding agents, and antiblocking agents.

Examples of the crystal nucleating agents include α-crystal nucleating agents such as sorbitol-based nucleating agents, organophosphate metal salt-based compounds, organocarbonate metal salt-based compounds, and rosin-based compounds; and β-crystal nucleating agents such as amide-based compounds and quinacridone-based compounds. The content of the crystal nucleating agent is preferably 0.001 parts by weight or more based on 100 parts by weight of the stack for compression molding in order to acquire an effect of the addition sufficiently and it is preferably 1.5 parts by weight or less relative to 100 parts by weight in total of the stack for compression molding in order to suppress deterioration of the dispersibility of the nucleating agent.

The stack for compression molding can be produced by a publicly known stacking method, such as a co-extrusion method, a method of heating and press-adhering a layer A and a layer B together and a method of adhering a layer A and a layer B together via an adhesive layer. The stack for compression molding may be one in which a layer A and a layer B are stacked without adhering.

The molded article of the present invention is obtained by compression molding the stack of the present invention, and specifically, it is obtained by heating and compressing the stack in its thickness direction. It is preferred with the molded article of the present invention that a plane perpendicular to the thickness direction of the inorganic filler (B2) contained in the molded article be oriented to be parallel with the direction along which the individual components contained in the stack for compression molding flow during heat compression.

The orientation state of the inorganic filler (B2) in a molded article can be evaluated by measuring the wide angle X-ray scattering of the molded article.

The orientation state of the inorganic filler (B2) can be quantified by the degree of orientation of the inorganic filler (B2). The degree of orientation of the inorganic filler (B2) can be calculated from the following formula (2) using the half-value width of the azimuthal intensity distribution of a lattice plane perpendicular to the thickness direction of the inorganic filler (B2) of a two-dimensional wide angle X-ray scattering image. The scattering angle width to be used when the azimuthal intensity distribution is limited within 0.5°±the diffraction peak position derived from the lattice plane.

$$\text{Degree of orientation (\%)}=\{(180-hwd)/180\}\times 100 \quad \text{formula (2)}$$

In formula (2), hwd represents a half-width (unit: degree) in the azimuthal intensity distribution of the lattice plane of the inorganic filler (B2) perpendicular to the thickness direction.

It can be said that the larger the value of the degree of orientation, the more closely parallel with the direction along which the individual components contained in the stack for compression molding flow during heat compression the plane of the inorganic filler (B2) is oriented.

The degree of orientation of the inorganic filler (B2) contained in the molded article of the present invention is 80% or more, and it is preferably 85% or more in order to improve impact resistance.

Since atoms within a crystal of the propylene polymer component (B1) are arrayed repeatedly with three-dimensional periodicity, crystals are believed to be a body in which parallelepipeds having a fixed structure are piled up three-dimensionally in consideration of the periodicity. Such a parallelepiped is defined as a unit lattice. Three sides of the unit lattice are called "a axis", "b axis", and "c axis", respectively. In a unit lattice of an α-crystal polypropylene crystal, the direction of its molecular chain is called "c axis", and the minor axis of the other two axes is called "a axis" and the major axis is called "b axis".

It is preferred with the molded article of the present invention that the c axis or the a axis of the α-crystal of the crystal structures of the propylene polymer component (B1) be oriented parallel with the flow direction at the time of heat compression. The impact strength of a molded article can be increased by the fact that the c axis or the a axis of the α-crystal of the crystal structures of the propylene polymer component (B1) is oriented parallel with the direction along which the individual components contained in a stack for compression molding flow during heat compression.

The orientation state of the crystals of the propylene polymer component (B1) can be evaluated by measuring the wide angle X-ray scattering of a molded article.

The orientation state of the crystals of the propylene polymer component (B1) can be quantified by the degree of crystal orientation. The degree of crystal orientation can be calculated from the following formula (3) using the half-value width of the azimuthal intensity distribution of the (040) plane of a two-dimensional wide angle X-ray scattering image. The scattering angle width to be used when the azimuthal intensity distribution is limited within 0.5°±the diffraction peak position derived from the (040) plane.

$$\text{Degree of crystal orientation (\%)} = \{(180 - hw040)/180\} \times 100 \quad \text{formula (3)}$$

In formula (3), hw040 represents a half-width (unit: degree) in the azimuthal intensity distribution of the (040) plane of the α-crystal of the propylene polymer component (B1).

It can be said that the larger the value of the degree of crystal orientation, the more closely parallel with the direction along which the individual components contained in the stack for compression molding flow during heat compression the c axis or the a axis of the α-crystal of the propylene polymer component (B1) is oriented.

The degree of crystal orientation of the propylene polymer component (B1) contained in the molded article of the present invention is 75% or more, and preferably is 80% or more.

The molded article of the present invention is obtained by heat compressing the above-described stack for compression molding at a temperature near the melting point of the propylene polymer component (B1).

When heat compressing a stack for compression molding, the temperature of a pressurization part that comes into contact with the stack for compression molding in an apparatus to be used for the heat compression is a temperature in the vicinity of the melting point (Tm) of the propylene polymer component (B1), and preferably from (the melting point (Tm)−20° C.) to (the melting point (Tm)+10° C.), and more preferably from (the melting point (Tm)−10° C.) to (the melting point (Tm)+5° C.).

The period of time for which a stack for compression molding is preferably not less than 15 seconds and not more than 60 minutes, more preferably not less than 1 minute and less than 30 minutes, even more preferably not less than 10 minutes and less than 15 minutes, in order to improve the impact resistance of a molded article or to prevent the thermal degradation of the components contained in the stack.

Examples of the apparatus for heat compressing a stack for compression molding include a press forming machine having a temperature control function, a track belt type hot press machine, a belt type pressurizable sealer, and a compression rolling machine. Preferred as a method of heat compression is a method of heat compressing a stack for compression molding in its thickness direction by using a press forming machine having a temperature control function.

One possible method for heat compressing a stack for compression molding is to apply a lubricant to a pressurization part of an apparatus for heat compression that comes into contact with a stack for compression molding. Examples of the lubricant include silicone oil. Since the application of a lubricant reduces frictional resistance between a stack for compression molding and a pressurization part and, as a result, the stack for compression molding can be heat compressed more smoothly, it leads to improvement in molding cycle and reduction in the load on an apparatus for heat compression.

Molded articles obtained by the present invention can be further processed into a desired shape by using a publicly known method, such as a vacuum forming method, a pressure forming method, and a press forming method.

Molded articles obtained by the present invention can be laminated with other resin, metal, paper, or leather and used as a multilayer structure.

EXAMPLES

The present invention is illustrated by the following Examples and Comparative Examples. The propylene polymer components, the thermoplastic elastomer components, and the inorganic fillers used in Examples and Comparative Examples are shown below.

(1) Propylene Polymer Component (A1), Propylene Polymer Component (B1)

Propylene homopolymers were obtained by a gas phase polymerization method using the catalyst disclosed in JP-A-10-2123219 while controlling the hydrogen concentration in a polymerization reactor and the polymerization temperature.

(A1-1) Propylene homopolymer
  MFR (230° C., 2.16 kg load): 7.8 g/10 min
  Isotactic pentad fraction: 0.977
  Melting point: 163° C.
  Amount of heat of fusion: 106 J/g
(B1-1) Propylene homopolymer
  MFR (230° C., 2.16 kg load): 7.8 g/10 min
  Isotactic pentad fraction: 0.977
  Melting point: 163° C.
  Amount of heat of fusion: 106 J/g
(2) Thermoplastic Elastomer Component (A2)
(A2-1) Ethylene-(1-butene) copolymer
  (Trade name) ENGAGE ENR7447, produced by Dow DuPont Elastomer
  MFR (190° C., 2.16 kg load): 5.0 g/10 min
  Melting point: 47° C.
  Amount of heat of fusion: 47 J/g
  Ethylene content: 70% by weight
  1-Butene content: 30% by weight
(3) Inorganic Filler (B2)
(B2-1) Talc
  (Trade name) HAR W92, produced by Imerys
  50(L): 11 μm
  50(S): 2.5 μm The physical properties of raw material components and molded articles were measured in accordance with the methods described below.

(1) Melt Flow Rate (MFR; unit: g/10 min.)
Measurement was carried out in accordance with the method provided for in JIS K6758. The measurement was performed at a temperature 230° C. or 190° C. under a load of 2.16 kg.

(2) Isotactic Pentad Fraction ([mmmm])
A sample was prepared by dissolving about 200 mg of a resin sample in 3 ml of orthodichlorobenzene completely in a test tube having a diameter of 10 mm, and then a $^{13}$C-NMR spectrum of the sample was measured. The conditions for the measurement of the $^{13}$C-NMR spectrum as shown below.
<Measurement Conditions>
  Apparatus: Bruker Avance 600
  Measurement temperature: 135° C.
  Pulse repetition time: 10 seconds,
  Pulse width: 45°
  Transients: 2,500.

[mmmm] was calculated from the measured result in accordance with the method disclosed in the report by A. Zambelli et al. (Macromolecules 1973, 6, 925-926).

(3) Melting Point (Tm, unit: ° C.) and Amount of Heat of Fusion (ΔH, Unit: J/g)

A sheet of about 0.5 mm in thickness was prepared by subjecting a propylene polymer component or a thermoplastic elastomer component to hot press forming (preheating at 230° C. for 5 minutes, then raising the pressure to 5.0 MPa over 1 minute and holding the pressure for 2 minutes, subsequently cooling for 5 minutes at 30° C. and 5.0 MPa). The melting point and the amount of heat of fusion of the propylene polymer component and the thermoplastic elastomer component were measured using a differential scanning calorimeter (Diamond DSC, manufactured by PerkinElmer, Inc.). The measurement conditions are described below.

<Measurement Conditions>

A 10-mg fragment of a sheet prepared was heat-treated at 220° C. for 5 minutes under a nitrogen atmosphere, then cooled to 50° C. at a temperature ramp-down rate of 5° C./minute, subsequently held at 50° C. for 1 minute, and then heated from 50° C. to 180° C. at a temperature ramp-up rate of 5° C./minute.

<Tm and Method of Calculating ΔH>

In a DSC curve obtained during DSC temperature elevation, the peak top temperature in the endothermic peak of the higher temperature-side is denoted by Tm (° C.). The peak area of all the peaks derived from heat absorption in the DSC curve is denoted by ΔH (J/g).

(4) Content of Constitutional Units Derived from Ethylene and Content of Constitutional Units Derived from 1-butene A sample was prepared by dissolving about 200 mg of a resin sample in 3 ml of orthodichlorobenzene completely in a test tube having a diameter of 10 mm, and then a $^{13}$C-NMR spectrum of the sample was measured. The conditions for the measurement of the $^{13}$C-NMR spectrum as shown below.

<Measurement Conditions>

Apparatus: Bruker Avance 600
Measurement temperature: 135° C.
Pulse repetition time: 10 seconds
Pulse width: 45°
Transients: 2,500.

The content of the constitutional units derived from ethylene was calculated from measurement results by the method disclosed in the report by M. Kakugo et al. (Macromolecules 1982, 15, 1150-1152), and the content of the constitutional units derived from 1-butene was calculated by subtracting the content of the constitutional units derived from ethylene from 100% by weight.

(6) Median Diameter D50(L) to be Measured by the Laser Diffraction Method

A median diameter D50(L) to be measured by the laser diffraction method was determined by the following method. A sample dispersed in ethanol by using a homogenizer was measured in accordance with JIS R1629 by using a Microtrac particle size analyzer ("MT-3300EX II", manufactured by Nikkiso Co., Ltd.), and then D50(L) was determined from the particle diameter value at an accumulated amount of 50% by weight read from the resulting particle size accumulation distribution curve.

(7) Median Diameter D50(S) to be Measured by the Centrifugal Sedimentation Method A median diameter D50(S) to be measured by the centrifugal sedimentation method was determined by the following method. A sample dispersed in ethanol by using an ultrasonic cleansing apparatus was measured in accordance with JIS R1619 by using a centrifugal sedimentation type particle size distribution analyzer ("SA-CP3", manufactured by Shimadzu Corporation), and then D50(S) was determined from the particle diameter value at an accumulated amount of 50% by weight read from the resulting particle size accumulation distribution curve.

(5) Wide Angle X-ray Scattering

The wide angle X-ray scattering of a molded article was measured under the following conditions.

<Measurement Conditions>

Device: ultraX18 manufactured by Rigaku
X-ray source: CuKα line
Voltage: 40 kV
Current: 200 mA
Detector: X-rays photon-counting type two-dimensional detector PILATUS
Measurement method: transmission method <Measurement Method>

(1) The above-described molded article was cut in parallel with a plane containing both a first axis in the direction in which a resin composition flowed due to heat compression when a molded article was produced and a second axis in the thickness direction of the molded article perpendicular to the first axis, thereby forming a cut surface.

(2) X-rays were applied to a position in the cut surface which was deep at the same distance from both surfaces of the molded article and then a wide angle X-ray scattering profile was measured.

<Method for Measuring the Degree of Crystal Orientation of Propylene Polymer Component (B1) Contained in Molded Article>

The degree of crystal orientation of a propylene polymer component B1 was evaluated using the following method.

(1) Using the wide angle X-ray scattering profile produced by the above-described measurement, the azimuthal intensity distribution derived from the (040) plane of an α-crystal of the propylene polymer component (B1) was determined.

(2) From the resulting azimuthal intensity distribution, a half-value width at a peak position was determined, and a degree of crystal orientation was calculated from the following formula (3).

$$\text{Degree of crystal orientation (\%)} = \{(180-hw040)/180\} \times 100 \quad \text{formula (3)}$$

wherein hw040 represents a half-width (unit: degree) in the azimuthal intensity distribution of the (040) plane of the propylene polymer component (B1).

<Method for Measuring the Degree of Orientation of Inorganic Filler (B2) Contained in Molded Article>

The degree of crystal orientation of an inorganic filler (B2) was assessed using the following method.

(1) Using the wide angle X-ray scattering profile produced by the above-described measurement, the azimuthal intensity distribution derived from the lattice plane of an inorganic filler (B2) perpendicular to the thickness direction was determined.

(2) From the resulting azimuthal intensity distribution, a half-value width at a peak position was determined, and a degree of orientation of the inorganic filler (B2) was calculated from the following formula (2).

$$\text{Degree of orientation (\%)} = \{(180-hwd)/180\} \times 100 \quad \text{formula (2)}$$

wherein hwd represents a half-width (unit: degree) in the azimuthal intensity distribution of the lattice plane of the inorganic filler (B2) perpendicular to the thickness direction.

<Izod Impact Strength (Unit: kJ/m$^2$)>

A specimen of 12.8 mm in width and 63.5 mm in length was cut out from a molded article and was used for measurement. The measurement conditions were in accordance with JIS K7110 and Izod impact strength at 23° C. was measured.

Example 1

(Preparation of Layer A)

A propylene homopolymer (A1-1), a thermoplastic elastomer component (A2), and an inorganic filler (B2) were mixed in the quantities shown in Table 1 and mixed uniformly while being in a powder state and then melt-kneaded under conditions including a cylinder preset temperature of 220° C., a screw rotation speed of 5100 rpm, and an extrusion rate of about 4 kg/hour by using a 15-mm twin screw extruder KZW15-45MG (manufactured by Technovel Corporation). The melt-kneaded matter was put into a frame of a 0.1-mm thick spacer having a frame shape, and the spacer and the melt-kneaded matter were sandwiched between 0.5-mm thick aluminum plates sized larger than the spacer, and then the resultant was sandwiched between 2-mm thick stainless steel plates sized larger than the aluminum plates. The resulting combination was placed in a hot press forming machine whose press plates had been preset at 230° C. and then preheated for 5 minutes. Subsequently, the pressure was increased to 10 MPa and then the pressure was held for 5 minutes, followed by cooling at 30° C. and 30 MPa for 5 minutes. Thus, a 0.1-mm thick sheet was prepared. This was cut into a size of 48 mm×48 mm, thereby obtaining layer A.

(Preparation of Layer B)

A propylene homopolymer (A1-1) and an inorganic filler (B2) were mixed in the quantities shown in Table 1 and mixed uniformly while being in a powder state and then melt-kneaded under conditions including a cylinder preset temperature of 220° C., a screw rotation speed of 5100 rpm, and an extrusion rate of about 4 kg/hour by using a 15-mm twin screw extrude KZW15-45MG (manufactured by Technovel Corporation). The melt-kneadate was injection molded at a molding temperature of 220° C. and a mold temperature of 50° C. by using an SI30III type injection molding machine manufactured by Toyo Machinery & Metal Co., Ltd.) and thus a molded article sized 48 mm×48 mm×3 mm in thickness was obtained. Four sheets of this molded article were piled up, thereby obtaining a 12-mm thick layer B.

(Preparation of a Stack for Compression Molding)

A stack for compression molding 1 was prepared by stacking one layer A on the upper surface of the layer B. The ratio of the thickness of layer A of the stack for compression molding is shown in Table 1.

(Preparation of Molded Article)

The above-described stack for compression molding was put into a hot press forming machine whose press plates had been preset at 160° C., and the pressure was increased to 100 t and then held for 5 minutes. Subsequently, the machine was cooled to 80° C. while keeping the pressure and then the pressure was released. Thus, a 2-mm thick molded article was obtained. The physical properties of the resulting molded article are shown in Table 2.

Example 2

A molded article was prepared by the same method as Example 1 except that the thickness of layer A was changed to 1 mm. The ratio of the thickness of layer A of the stack for compression molding is shown in Table 1 and the physical properties of the resulting molded article are shown in Table 2.

Example 3

A molded article was prepared by the same method as Example 1 except that the composition of layer A was changed as shown in Table 1. The ratio of the thickness of layer A of the stack for compression molding is shown in Table 1 and the physical properties of the resulting molded article are shown in Table 2.

Example 4

A molded article was prepared by the same method as Example 1 except that the composition of layer A was changed as shown in Table 1. The ratio of the thickness of layer A of the stack for compression molding is shown in Table 1 and the physical properties of the resulting molded article are shown in Table 2.

Comparative Example 1

A molded article was prepared by the same method as Example 1 except that the thickness of layer A was changed to 2 mm. The ratio of the thickness of layer A of the stack for compression molding is shown in Table 1 and the physical properties of the resulting molded article are shown in Table 2.

Comparative Example 2

A molded article was prepared by the same method as Example 1 except that the composition of layer A was changed as shown in Table 1. The ratio of the thickness of layer A of the stack for compression molding is shown in Table 1 and the physical properties of the resulting molded article are shown in Table 2.

Comparative Example 3

A molded article was prepared by the same method as Example 1 except that the thickness of layer A was changed to 0.04 mm. The ratio of the thickness of layer A of the stack for compression molding is shown in Table 1 and the physical properties of the resulting molded article are shown in Table 2.

Comparative Example 4

A molded article was prepared by the same method as Example 1 except that the composition of layer A was changed as shown in Table 1. The ratio of the thickness of layer A of the stack for compression molding is shown in Table 1 and the physical properties of the resulting molded article are shown in Table 2.

Comparative Example 5

A molded article was prepared by the same method as Comparative Example 1 except that the composition of layer A was changed as shown in Table 1. The ratio of the thickness of layer A of the stack for compression molding is shown in Table 1 and the physical properties of the resulting molded article are shown in Table 2.

TABLE 1

| | Component | | Examples | | | | Comparative Examples | | | | |
|---|---|---|---|---|---|---|---|---|---|---|---|
| | | | 1 | 2 | 3 | 4 | 1 | 2 | 3 | 4 | 5 |
| Layer A | A1 (% by weight) | A1-1 | 62.5 | 62.5 | 50 | 65 | 62.5 | 95 | 62.5 | 15 | 65 |
| | A2 (% by weight) | A2-1 | 37.5 | 37.5 | 50 | 35 | 37.5 | 5 | 37.5 | 85 | 35 |
| | B2 (part by weight) | B2-1 | 25 | 25 | 25 | — | 25 | 25 | 25 | 25 | — |
| Layer B | B1 (% by weight) | B1-1 | 60 | 60 | 60 | 60 | 60 | 60 | 60 | 60 | 60 |
| | B2 (% by weight) | B2-1 | 40 | 40 | 40 | 40 | 40 | 40 | 40 | 40 | 40 |
| | Ratio of the thickness of layer A (%) | | 0.826 | 7.69 | 0.826 | 0.826 | 14.3 | 0.826 | 0.332 | 0.826 | 14.3 |

TABLE 2

| | Examples | | | | Comparative Examples | | | | |
|---|---|---|---|---|---|---|---|---|---|
| | 1 | 2 | 3 | 4 | 1 | 2 | 3 | 4 | 5 |
| Degree of crystal orientation (%) | 84 | 78 | 78 | 82 | 84 | 77 | 78 | 81 | 81 |
| Degree of filler orientation (%) | 87 | 86 | 88 | 85 | 88 | 89 | 87 | 86 | 86 |
| Izod impact strength (kJ/m$^2$) | 29 | 29 | 35 | 29 | 25 | 26 | 23 | 24 | 26 |

INDUSTRIAL APPLICABILITY

According to the present invention, a stack for compression molding suitable as a material of a molded article excellent in impact resistance is provided, and a molded article excellent in impact resistance can be obtained by compression molding the stack.

The invention claimed is:

1. A molded article comprising a layer A and a layer B each defined below, wherein where the sum total of the thickness of the layer A and the thickness of the layer B is taken as 100%, the ratio of the thickness of the layer A is 0.5% to 10% and the ratio of the thickness of the layer B is 90% to 99.5%, the layer A is disposed to form at least one surface of the molded article,
    layer A: a layer comprising a propylene polymer component (A1) and a thermoplastic elastomer component (A2), wherein the content of (A1) is 20% by weight to 80% by weight and the content of (A2) is 20% by weight to 80% by weight, provided that the sum total of the content of (A1) and the content of (A2) is taken as 100% by weight,
    layer B: a layer comprising a propylene polymer component (B1) and an inorganic filler (B2), wherein the content of (B1) is 50% by weight to 80% by weight and the content of (B2) is 20% by weight to 50% by weight, provided that the sum total of the content of (B1) and the content of (B2) is taken as 100% by weight, and
said molded article satisfying a requirement (2) in which the inorganic filler (B2) contained in the molded article has a degree of orientation that is 80% or more as determined by formula (2):

$$\text{degree of orientation (\%)} \{(180-\text{hwd})/180\} \times 100 \quad \text{formula (2),}$$

wherein formula (2) hwd represents a half-width (unit: degree) in the azimuthal intensity distribution of the lattice plane of the inorganic filler (B2) perpendicular to the thickness direction.

2. The molded article according to claim 1, wherein the inorganic filler (B2) satisfies requirement (1-a), requirement (1-b), and requirement (1-c) described below,
    requirement (1-a): a median diameter D50(L) of the inorganic filler (B2) measured by the laser diffraction method in accordance with JIS R1629 is 10 μm to 25 μm,
    requirement (1-b): a median diameter D50(S) of the inorganic filler (B2) measured by the centrifugal sedimentation method in accordance with JIS R1619 is 2 μm to 8 μm,
    requirement (1-c): an aspect ratio constant of the inorganic filler (B2) calculated by the following formula (1) is 2 to 15, $$\text{aspect ratio constant} = \{D50(L) - D50(S)\}/D50(S) \quad \text{formula (1).}$$

3. The molded article according to claim 2, wherein the inorganic filler (B2) is talc.

4. The molded article according to claim 2, wherein said molded article is obtainable by heating and compressing a stack for compression molding in the thickness direction of the stack.

5. The molded article according to claim 1, wherein the inorganic filler (B2) is talc.

6. The molded article according to claim 5, wherein said molded article is obtainable by heating and compressing a stack for compression molding in the thickness direction of the stack.

7. The molded article according to claim 1 that satisfies the following requirement (3),
    requirement (3): a degree of crystalline orientation of the propylene polymer component (B1) contained in the molded article that is 75% or more as determined by the following formula (3):

$$\text{degree of crystalline orientation (\%)} = \{(180-\text{hw040})/180\} \times 100 \quad \text{formula (3),}$$

wherein formula (3), hw040 represents a half-width (unit: degree) in the azimuthal intensity distribution of the (040) plane of the crystal structure derived from the propylene polymer component (B1).

8. The molded article according to claim 7, wherein said molded article is obtainable by heating and compressing a stack for compression molding in the thickness direction of the stack.

9. A molded article obtainable by heating and compressing a stack for compression molding in the thickness direction of the stack, said molded article comprising a layer A and a layer B each defined below, wherein where the sum total of the thickness of the layer A and the thickness of the layer B is taken as 100%, the ratio of the thickness of the layer A is 0.5% to 10% and the ratio of the thickness of the layer B is 90% to 99.5%, the layer A is disposed to form at least one surface of the stack,
    layer A: a layer comprising a propylene polymer component (A1) and a thermoplastic elastomer component (A2), wherein the content of (A1) is 20% by weight to 80% by weight and the content of (A2) is 20% by weight to 80% by weight, provided that the sum total of the content of (A1) and the content of (A2) is taken as 100% by weight, layer B: a layer comprising a propylene polymer component (B1) and an inorganic filler (B2), wherein the content of (B1) is 50% by weight to 80% by weight and the content of (B2) is 20% by weight to 50% by weight, provided that the sum total of the content of (B1) and the content of (B2) is taken as 100% by weight, and said molded article satisfying a requirement (2) in which the inorganic filler (B2) contained in the molded article has a degree of orientation that is 80% or more as determined by formula (2):

$$\text{degree of orientation (\%)}\{(180-hwd)/180\} \times 100 \qquad \text{formula (2),}$$

wherein formula (2) hwd represents a half-width (unit: degree) in the azimuthal intensity distribution of the lattice plane of the inorganic filler (B2) perpendicular to the thickness direction.

* * * * *